United States Patent
Terzis et al.

(10) Patent No.: US 10,075,877 B1
(45) Date of Patent: Sep. 11, 2018

(54) SYSTEMS AND METHODS FOR USING RADIO LAYER INFORMATION TO ENHANCE NETWORK TRANSFER PROTOCOLS

(71) Applicant: Google Inc., Mountain View, CA (US)

(72) Inventors: Andreas Terzis, Mountain View, CA (US); Ankur Jain, Mountain View, CA (US); Hao Du, San Jose, CA (US); Feng Lu, La Jolla, CA (US)

(73) Assignee: Google LLC, Mountain View, CA (US)

( * ) Notice: Subject to any disclaimer, the term of this patent is extended or adjusted under 35 U.S.C. 154(b) by 210 days.

(21) Appl. No.: 14/310,739

(22) Filed: Jun. 20, 2014

Related U.S. Application Data

(63) Continuation-in-part of application No. 14/275,120, filed on May 12, 2014.

(51) Int. Cl.
H04W 28/10 (2009.01)

(52) U.S. Cl.
CPC .................. H04W 28/10 (2013.01)

(58) Field of Classification Search
CPC .................................. H04W 28/10
See application file for complete search history.

(56) References Cited

U.S. PATENT DOCUMENTS

| | | | | |
|---|---|---|---|---|
| 6,298,070 B1 * | 10/2001 | Carlson | ................... | H04L 47/10 370/465 |
| 6,889,050 B1 * | 5/2005 | Willars | ................... | H04L 47/10 370/329 |
| 7,953,870 B1 * | 5/2011 | Reeves | ................ | H04L 41/0816 709/223 |
| 8,009,697 B2 * | 8/2011 | Peeters | ................. | H04L 1/1803 370/473 |
| 2002/0012334 A1 | 1/2002 | Strawczynski et al. | | |
| 2002/0129159 A1 * | 9/2002 | Luby | ...................... | H04L 69/14 709/236 |
| 2003/0145100 A1 * | 7/2003 | Marchetto | ............... | H04L 47/10 709/233 |
| 2004/0076173 A1 * | 4/2004 | Marchetto | ............... | H04L 47/10 370/447 |
| 2005/0272452 A1 * | 12/2005 | Khoury | ................... | H04W 4/12 455/466 |
| 2006/0173860 A1 * | 8/2006 | Ikebe | ...................... | H04L 67/42 |
| 2007/0173270 A1 * | 7/2007 | Block | ................... | H04W 74/06 455/507 |

(Continued)

OTHER PUBLICATIONS

US Office Action in U.S. Appl. No. 14/275,120 dated Nov. 6, 2015.

(Continued)

*Primary Examiner* — Chirag Shah
*Assistant Examiner* — Joshua Smith
(74) *Attorney, Agent, or Firm* — McDermott Will & Emery LLP

(57) ABSTRACT

A method of data communication rate control is provided. The method includes an application service provider receiving, from a mobile service provider, an indication of a data rate for transmission of data from a server associated with the application service provider to a mobile device. The method also includes transmitting data to the mobile device from the server associated with the application service provider based on the received data rate indication.

19 Claims, 8 Drawing Sheets

(56) References Cited

U.S. PATENT DOCUMENTS

| | | | |
|---|---|---|---|
| 2007/0195820 A1* | 8/2007 | So | H04L 1/0007 370/470 |
| 2008/0181259 A1* | 7/2008 | Andreev | H04L 65/80 370/519 |
| 2009/0142055 A1* | 6/2009 | Qiu | H04J 14/0227 398/45 |
| 2009/0310599 A1* | 12/2009 | Seol | H04L 65/104 370/352 |
| 2010/0020685 A1* | 1/2010 | Short | H04L 12/14 370/401 |
| 2012/0218899 A1* | 8/2012 | Ozawa | H04L 65/103 370/237 |
| 2013/0166620 A1* | 6/2013 | Branson | H04L 67/10 709/201 |
| 2013/0297815 A1* | 11/2013 | Ma | H04L 65/608 709/231 |
| 2014/0022974 A1* | 1/2014 | Eriksson | H04W 56/0005 370/311 |
| 2014/0115150 A1* | 4/2014 | Ewanchuk | H04L 67/145 709/224 |
| 2014/0155028 A1* | 6/2014 | Daniela | H04W 12/02 455/411 |
| 2014/0293823 A1 | 10/2014 | Lee et al. | |
| 2014/0302811 A1* | 10/2014 | Chen | H04W 72/048 455/405 |
| 2014/0378149 A1* | 12/2014 | Lau | H04W 76/045 455/450 |
| 2015/0103766 A1* | 4/2015 | Miklos | H04W 72/042 370/329 |
| 2015/0236938 A1 | 8/2015 | Thapliya | |
| 2015/0257035 A1* | 9/2015 | Grinshpun | H04L 65/4092 370/235 |
| 2015/0358483 A1* | 12/2015 | Jeong | H04W 28/0289 370/328 |

OTHER PUBLICATIONS

Office Action dated Jun. 23, 2016 in U.S. Appl. No. 14/275,120 (10 pages).
Notice of Allowance dated Apr. 19, 2017 in U.S. Appl. No. 14/275,120 (9 pages).
Notice of Allowance dated Oct. 31, 2017 in U.S. Appl. No. 14/275,120.

* cited by examiner

SYSTEMS AND METHODS FOR USING RADIO LAYER INFORMATION TO ENHANCE NETWORK TRANSFER PROTOCOLS

CROSS-REFERENCE TO RELATED APPLICATIONS

This application is a continuation-in-part of U.S. patent application Ser. No. 14/275,120, filed May 12, 2014, and entitled "SYSTEMS AND METHODS FOR USING RADIO LAYER INFORMATION TO ENHANCE NETWORK TRANSFER PROTOCOLS", the disclosure of which is hereby incorporated by reference.

FIELD OF THE INVENTION

The system and methods described herein generally relate to mobile communications, and, more specifically, to mobile communication rate control.

BACKGROUND

Mobile devices communicate with networks via radio communication with base stations. Network transport protocols are used to deliver data between two applications over a network such as the Internet. The transmission control protocol (TCP) is the most commonly used network transport protocol. TCP allows reliable delivery of data over a computer network, for example, the Internet. A TCP sender adjusts its sending rate to avoid continuously overloading the network. TCP is robust and efficient for wired networks. In cellular networks, the bandwidth can change rapidly. The congestion avoidance process provided by TCP often cannot react quickly enough to optimize the transfer rate. This inefficiency can be costly for cellular carriers and prevents increased quality of service for end-users.

SUMMARY

One aspect of the present disclosure is directed to a method of data communication rate control. The method includes an application service provider receiving, from a mobile service provider, an indication of a data rate for transmission of data from a server associated with the application service provider to a mobile device. The method also includes transmitting data to the mobile device from the server associated with the application service provider based on the received data rate indication.

Another aspect of the present disclosure is directed to computer readable media storing processor executable instructions which when carried out by one or more processors cause the processors to receive an indication of a data rate for transmission of data from a server to a mobile device from a mobile service provider. The computer readable media also stores instructions causing the processors to transmit data to the mobile device from the server based on the received data rate indication.

Another aspect of the present disclosure is directed to a system for data communication rate control. The system includes one or more servers associated with an application service provider. The one or more server is configured to receive, from a mobile service provider, an indication of a data rate for transmission of data from the one or more server to a mobile device and transmit data to the mobile device based on the received data rate indication.

Another aspect of the present disclosure relates to a system. The system includes one or more servers associated with an application service provider. The one or more servers are configured to receive, from a mobile service provider, an indication of a timeout value associated with the allocation of data channels to one or more mobile devices. The one or more servers are also configured to determine a data chunk size for use in transmitting data to a mobile device communicating with the one or more servers based on the received timeout value and to transmit data to the mobile device based on the determined chunk size.

BRIEF DESCRIPTIONS OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are descriptions of various concepts related to, and implementations of, methods and systems for using radio layer information to enhance network transport protocols in mobile networks. The various concepts introduced above and discussed in greater detail below may be implemented in any of numerous ways, as the described concepts are not limited to any particular manner of implementation. Examples of specific implementations and applications are provided primarily for illustrative purposes.

The present disclosure is directed generally to using radio layer information to control data rates and data chunk sizes for transmission of content in mobile networks. Mobile devices communicate with servers connected to a network to receive data. This communication is facilitated through the radio communication between a mobile device and a base station that is connected to the network. The bandwidth available for the receipt and transmission of data by the mobile device over the network is affected by the quality of the connection between the base station and the mobile device as well as the cellular network conditions, including congestion of the cellular channels. Both of these factors can change rapidly. Commonly used protocols for transport of data from a server to a mobile device are not designed to respond to changes in available bandwidth as rapidly as the available bandwidth can change. This can result in under-utilization of network resources available for data transport or undue congestion of the network. Both under-utilization of available bandwidth and packet loss from undue congestion can result in costly inefficiencies for cellular service providers and content providers. For example, extra congestion can result in packet loss, a need for larger buffers, and more base station-to-network bandwidth than needed. Large buffers can result in larger network latencies and higher costs for the network equipment. Delivery of content to an application on the mobile device can suffer from under-utilization of network resources that decreases the quality of service experienced by end users.

Figure 1:
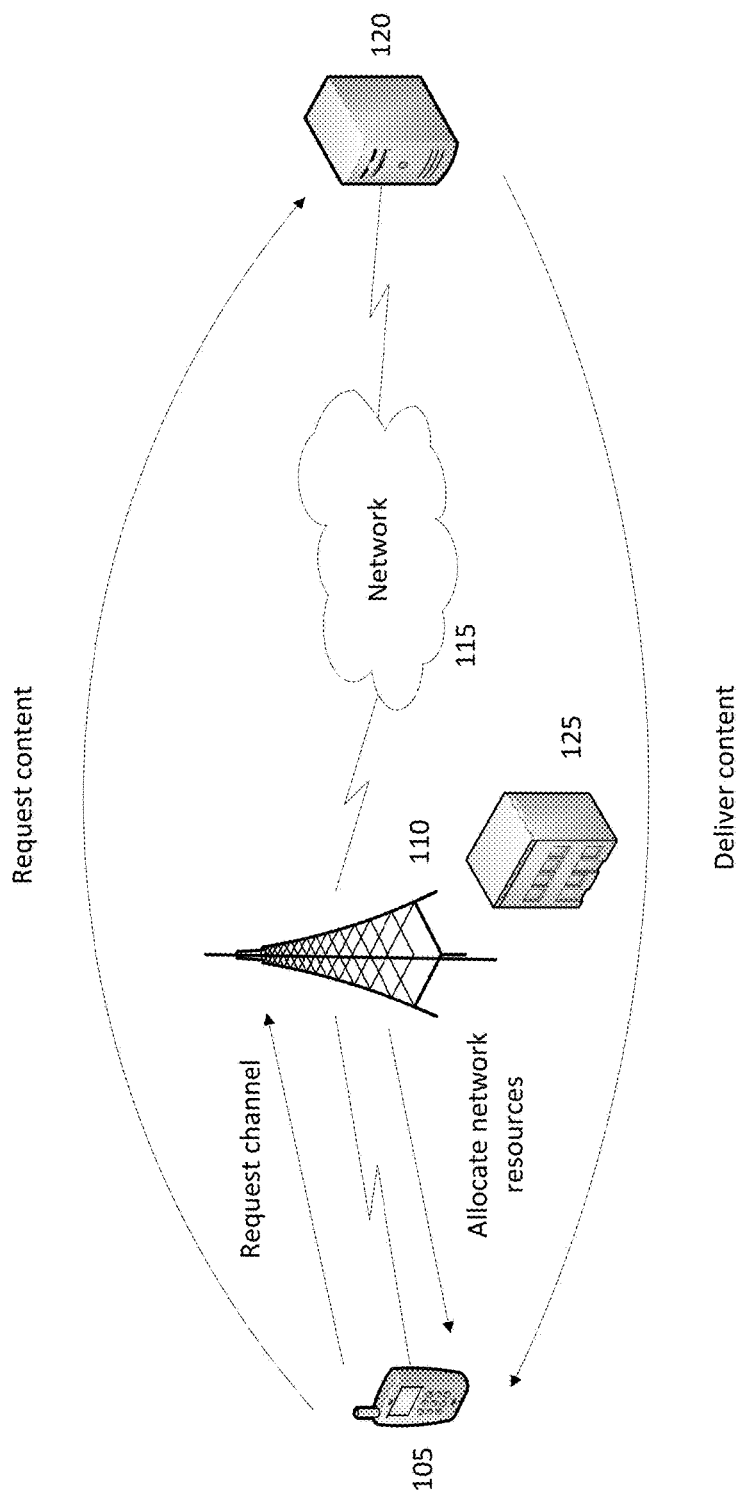
FIG. 1 is a block diagram of a mobile device in communication with a server connected to a network.

FIG. 1 depicts a mobile device 105 in communication with a server 120 in a network 115. The mobile device 105 transmits and receives information with the server 120 through a base station 110. The base station 110 is in radio communication with the mobile device 105 and is also in communication with the network 115. In some implementations, a mobile switching center 125 is associated with the base station 110 and is in communication with the network 115.

The mobile device 105 can be a phone, tablet, computer, e-reader, smart-watch or other device capable of communication over a mobile network 115. The mobile device 105 includes a radio layer that facilitates communication with the base station 110. The mobile device 105 also executes applications that present content retrieved from servers 120 to an end-user.

The term "radio layer" refers generally to a portion of the physical abstraction layer, and in some cases, a portion of the data link layer of the open systems interconnection (OSI) model that is associated with radio communication by the mobile device 105. The radio layer includes one or more radio antennas, a wireless transceiver and associated software that executes on the mobile device 105, providing a wireless communication link with the base station 110. The radio layer facilitates communication with the base station 110. The radio layer can perform signal processing functions that convert data into signals to be transmitted and vice versa for signals received.

The radio layer transmits and receives signals to facilitate exchange of data by the mobile device 105. The radio layer can receive and transmit data using one of a variety of commonly employed standards for radio communication. Examples of such standards include advanced mobile phone protocol (AMPS), time division multiple access (TDMA), code-division multiple access (CDMA), global system for mobile communication (GSM), long term evolution (LTE), High Speed Packet Access (HSPA), general packet radio services (GPRS) or universal mobile telecommunications system (UMTS) or other wireless communication protocols.

The mobile device 105 executes an application that retrieves content from a server 120. The content can be in any format that may be presented on a mobile device 105, for example, graphical, text, image, audio, video, etc. Content can be streamed via web pages or dedicated applications. Examples of applications or websites that stream content include YouTube, Spotify and NetFlix. Applications executed by the mobile device 105, as well as software that facilitates end-user interaction with an application are included in the OSI abstraction layer referred to as the "application layer."

The network 115 is used by the mobile device 105 to access content stored on one or more servers 120. The network 115 includes any number of computing devices (e.g., computer, servers, routers, network switches, etc.) that are configured to receive and/or transmit data. The network 115 includes any number of hardwired and/or wireless connections between the computing devices. The network 115 can be a local-area network (LAN), such as a company intranet, a metropolitan area network (MAN), a wide area network (WAN), an inter-network such as the Internet, or a peer-to-peer network, e.g., an ad hoc WiFi peer-to-peer network or a combination of such networks. The network 115 may be public, private, or a combination of public and private networks. The network 115 may include mobile telephone networks using any standards used to communicate among mobile devices 105, including the above mentioned wireless communication standards. In some implementations, the network 115 includes a provider network, operated by a network provider and/or one or more transit networks.

A server 120 can be a computing device configured to host a resource, such as a web page or other resource (e.g., streaming media, articles, comment threads, audio, video, graphics, search results, information feeds, etc.). Servers 120 provide content to mobile devices 105 and/or to other computing devices via the network 115. Servers 120 can be a computer server (e.g., a file transfer protocol (FTP) server, file sharing server, web server, etc.) or a combination of servers (e.g., a data center, a cloud computing platform, etc.). A server 120 can include any type of memory, media, or memory devices capable of storing content. For instance, servers 120 can include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, servers 120 are part of a data storage system capable of receiving and responding to queries from computing devices, including mobile devices 105. In some instances, content can be stored in a database and retrieved by a server 120 for transmission. Servers 120 can be located in data centers associated with the network 115. Data centers in the network 115 can be geographically dispersed. Content can be distributed across multiple servers 120. Servers 120 can be dedicated to specific content or content can be stored in a computer memory or database associated with the network 115 and accessed by servers 120.

An application on the mobile device 105 delivers content from the network 115 to an end user via the mobile device 105. The mobile device 105 requests content from the server 120 over the network 115. The request can be a sequence of data packets sent from the mobile device 105 to the server 120. The request can be in the form of one of many Internet protocols such as HTTP, HTTPS, FTP, TELNET, one of any existing protocols encapsulated by another underlay protocol such as VPN, or any other protocol that the application running on the mobile device 105 and the server 120 understand. For example, the request can be a hypertext transfer protocol (HTTP) request that specifies a method for the interaction between the mobile device 105 and the server 120, for example, a "GET" method, and specifies the content to be retrieved, for example, by identifying a uniform resource identifier (URI). An HTTP request is an example of a protocol implemented at the application layer. Requests for communication with a server 120 for content are generally initiated by software executed at the application layer of the mobile device 105.

The server 120 receives the request for content from the mobile device 105 and transmits the requested content to the mobile device 105 over the network 115. The server 120 can send a response to the request message sent by the mobile device 105 upon receiving a request. An example of such a response is an HTTP response. Transmission of the content includes sending data packets, that are the basic unit of data transmission, over the network 115. In general, a sequence of the transmitted data packets is identified by the server 120 and when the data packets are received by the mobile device 105, the application uses the sequence to reconstruct the content. The application delivers the content to a user through a user interface.

The mobile device 105 communicates with servers 120 in the network 115 through a base station 110 (also referred to as a "cell tower" or a "base transceiver station"). The base station 110 includes one or more antennas and one or more radio transceivers that can receive and transmit information to the mobile device 105 and is connected to the network 115 and the wireless connection between the base station 110 and the mobile device 105. The base station 110 can also include control electronics, various signal processors and one or more power supplies. The base station 110 can be a permanent structure or can be a temporary station that is capable of being set up in different locations. A mobile network or cellular network can include a plurality of cells. Each cell includes a base station 110 for communication with mobile devices 105 being operated within the cell.

In some implementations, the cell is coupled to a mobile switching center 125 associated with the provider network. The mobile switching center 125 performs switching functions such as call set-up, release and routing. The mobile switching center 125 can also facilitate handovers between base stations 110 of different cells of communication channels between the mobile device 105 and the server 120. The mobile switching center 125 can include network switches, servers and other networking hardware and is in communication with the network 115. The mobile switching center 125 can also include switching data such as routing tables used to perform switching functions. In some implementations, the mobile switching center 125 is in the same location as the base station 110. In other implementations, the mobile switching center 125 can be in a different location as the base station 110. The mobile switching center 125 can be connected to the base station via a provider network included in the network 115.

To communicate with the network 115 via the base station 110, the mobile device 105 requests a communication channel from the base station 110. The base station 110 and the mobile device 105 transmit and receive information from each other to determine the conditions of the channel between the mobile device 105 and the base station 110. The channel between the base station 110 and the mobile device 105 can be affected by multiple factors. Location of the mobile device 105 within a cell is one factor. In other words, the distance between the base station 110 and the mobile device 105 can affect the connection. In general, a greater distance between the base station 110 and the mobile device 105 results in a weaker connection. Radio frequency interference and physical obstacles are other factors that can affect the quality of the connection.

The base station 110 allocates network resources to a channel of communication with the mobile device 105 based on the conditions of the connection between the mobile device 105 and the base station 110 as well as network conditions. Network conditions include network congestion. For example, if the connection between the base station 110 and the mobile device 105 is poor, as indicated by channel characteristics, the base station 110 can deny the mobile device 105 a communication channel or it can allocate a channel with low bandwidth. Alternatively, if the connection between the base station 110 and the mobile device 105 is strong, the base station 110 will allocate a channel with a greater bandwidth. The base station 110, the mobile switching center 125, and the network 105 can be operated by a third party network provider. The third party network provider collects information about network conditions. In some implementations, the network provider makes decisions about bandwidth and channel allocation between the mobile device 105 and the base station 110. The network provider can also make decisions and/or recommendations about data rates between the mobile device 105 and the servers 120 over the network 115. Network condition information collected by the network operator can include, but is not limited to, channel quality index values, discontinuous transmission and discontinuous reception communication availability values, the number of active connections between a base station 110 and mobile devices 105 within a cell, the amount of bandwidth allocated to channels between mobile devices 105 in the cell and the base station 110 in the cell, base station 110 congestion levels, or network congestion levels.

Figure 2:
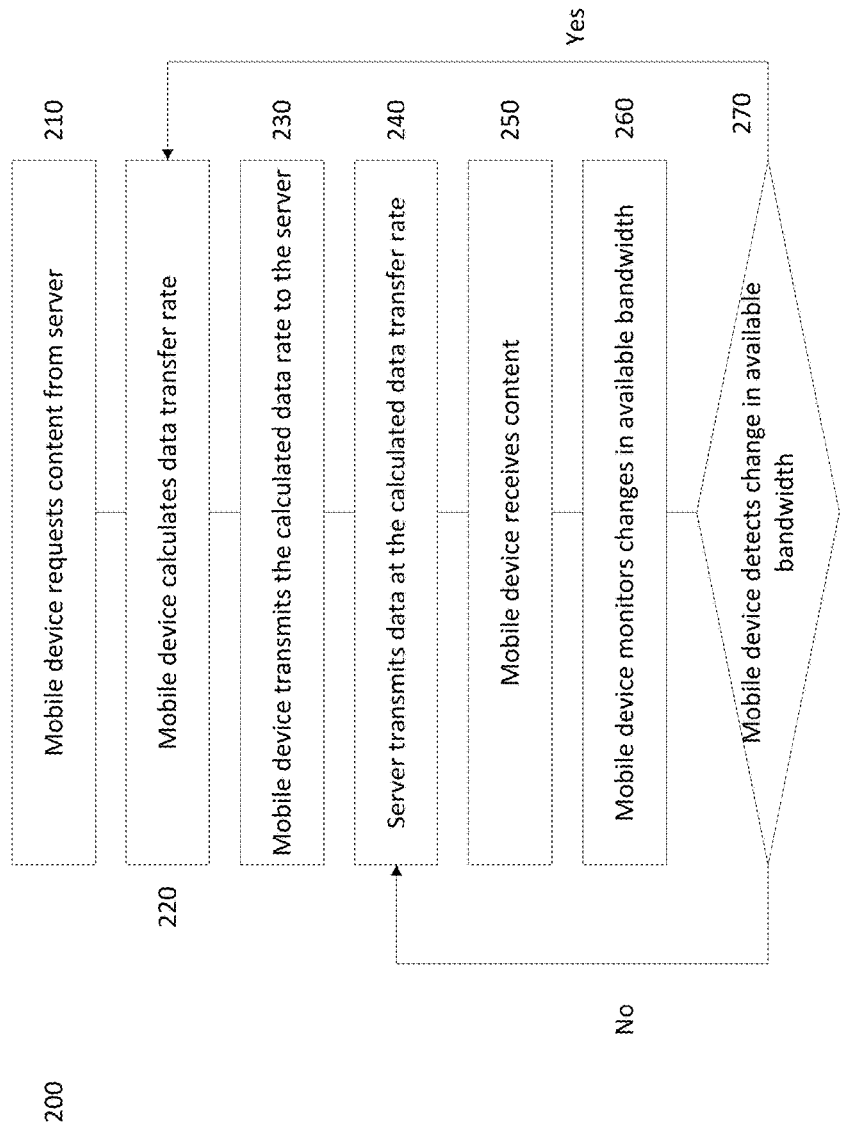
FIG. 2 is a flow diagram of a first example process of using radio layer information to improve content delivery from a server to a mobile device over a network.

FIG. 2 is a flow diagram depicting a process 200 used by a mobile device 105 to receive content from a server 120 over a network 115 via the wireless connection between the base station 110 and the mobile device 105. The process begins with the mobile device 105 requesting content from a server 120 in the network 115 (step 210). The mobile device 105 determines a data rate for the content to be transmitted by the server 120 to the mobile device 105 (step 220). The mobile device 105 transmits the determined data rate to the server 120 (step 230). The server 120 transmits the content at the determined data rate (step 240). The mobile device 105 receives the content (step 250). The mobile device 105 detects changes in the available bandwidth (step 260). If the mobile device 105 detects a change in available bandwidth (decision box 270), the mobile device 105 determines a new data rate for the transmission of the content by the server 120 to the mobile device 105 (returning to step 220). The steps depicted in FIG. 2 indicate an example of the order that the steps may be carried out in. In some implementations, the mobile device 105 can calculate the data rate (step 220) before requesting content (step 210). In some implementations, the mobile device 105 can transmit the calculated data rate to the server (step 230) together with the request for content (step 210).

The process 200 includes the mobile device 105 requesting content from a server 120 in the network 115 (step 210). As mentioned above, the content can include audio, video, images, text or other content. The content can be in the form of a discrete file (e.g., via FTP) or streamed media. As described above, an example of a request message is an HTTP request. Other examples of request messages are a remote procedure call such as a JSON-RPC, a request using FTP, RTSP, or one of numerous other protocols, or a data packet or suitable form of message to a server 120.

The mobile device 105 determines a data rate for the transmission of the content by the server 120 to the mobile device 105 (step 220) by using channel characteristics. Channel characteristics are metrics that describe the channel quality between the base station 110 and the mobile device 105. Channel characteristics can describe a wideband channel, including metrics for the entire channel between the mobile device 105 and the base station 110. Channel characteristics can also be specific to sub-bands that the wideband channel is divided into. The channel characteristics can include a channel quality index (CQI), a discontinuous transmission and discontinuous reception communication availability fraction (DTX/DRX fraction) and/or other metrics of channel quality between the base station 110 and the mobile device 105. Both CQI and DTX/DRX fraction can be expressed as numerical values. CQI and DTX/DRX are used by the mobile device 105 to calculate a data rate for the transmission of content from a server 120 to the mobile device 105. A more detailed example of a determination of a data rate by the mobile device 105 is discussed below in reference to FIG. 3B.

The channel characteristics can include a CQI value. To allocate a channel to the mobile device 105, the base station 110 exchanges information with the radio layer of the mobile device 105. The channel quality index (CQI) is a value that is generated at the radio layer of the mobile device 105 and is transmitted from the mobile device 105 to the base station 110. CQI is a metric that is commonly used in establishing a communication channel between a base station 110 and a mobile device 105 and its implementations and specifications are described by various Third Generation Partnership Project (3GPP) standards. CQI values are reported to base stations as part of many standard communication protocols. The CQI value is an integer that can be dependent on a signal-to-interference-and-noise ratio (SNIR) or other channel conditions observed by the radio layer. The CQI value can be dependent on the standard used for radio communication. For example, in HSDPA, the CQI value is an integer between one and thirty that is dependent on SNIR. In LTE, by contrast, the CQI value is an integer between one and fifteen and is not directly dependent on SNIR. In general, a CQI value is a measure of channel quality between the mobile device 105 and the base station 110. According to some mobile communication standards, CQI values directly correlate different supportable modulation and coding schemes for data transmission and reception. A CQI value is generally lower when the mobile device 105 is further from the base station 110 and higher when the mobile device 105 is closer to the base station 110.

In addition to CQI, other values that describe the quality of the connection between the mobile device 105 and the base station 110 can be included in channel characteristics that are used to determine a data rate for transmission of content to the mobile device 105. Some examples of other values that can be included in channel characteristics are a pre-coding matrix indicator (PMI) and a rank indicator (RI). A PMI value indicates a pre-coding matrix that should be used for transmission of data to the mobile device 105 and a RI value indicates the number of layers and the number of different signal streams transmitted to the mobile device 105 by the base station 110. These, along with other indicators of channel quality, can be used instead of or in combination with CQI as channel characteristics for determining a data rate by the mobile device 105.

The channel characteristics can also include a DTX/DRX fraction. Discontinuous transmission (DTX) and discontinuous reception (DRX) are processes by which data is transmitted and received discontinuously by the mobile device 105. Transmission and reception of data may be alternately turned off and turned on for periods of time in a DTX/DRX cycle. DTX/DRX cycles can be used by mobile devices 105 to improve battery life of the mobile device 105 as less battery is used during periods where transmission and reception of data are discontinued. DTX/DRX cycles can also be used to mitigate congestion on the available cellular channels where there is communication by a base station 110 with multiple mobile devices 105. For example, a base station 110 can transmit data to multiple mobile devices 105 in alternating temporal frames to allow communication with multiple mobile devices 105. A DTX/DRX fraction describes the amount of time within each DTX/DRX cycle that transmission and reception are discontinued. Thus, a DTX/DRX fraction indicates availability of a communication channel between the mobile device 105 and the base station 110. If the DTX/DRX fraction is equal to zero, the connection between the base station 110 and the mobile device 105 is continuous and the mobile device 105 always has the ability to transmit and receive data from the base station 110. If the DTX/DRX fraction is equal to one, the connection between the base station 110 and the mobile device 105 is always discontinued and there is no communication between the base station 110 and the mobile device 105. The radio layer of the mobile device 105 generates a DTX/DRX fraction. The DTX/DRX fraction can be used as an indication of cellular channel congestion as higher DTX/DRX fractions are expected when the base station is actively communicating with more mobile devices.

The mobile device 105 transmits the determined data rate to the server 120 (step 230). The mobile device 105 can transmit the determined data rate by any of numerous methods, for example, the mobile device 105 can send a data packet indicating the determined data rate, a remote procedure call (RPC), a TCP header, or another suitable message to the server 120 that specifies the data rate. In some implementations, the mobile device 105 may embed the determined data rate in acknowledgement packets sent to the server 120. The server 120 receives the transmitted data rate and transmits the content at the data rate indicated by the mobile device 105 (step 240). The server 120 can implement a congestion control system to transmit the content to the mobile device 105. An example of a congestion control system is discussed further below and in reference to FIG. 6.

The mobile device 105 receives the content from the server 120 over the network 115 and the wireless connection between the base station 110 and the mobile device 105 at the determined data rate (step 250). By transmitting the content at the determined data rate, congestion at the base station 110 is less likely and risk of packet loss that may result in a need for retransmission is reduced. Decrease in quality of service experienced by the end user of the mobile device 105 due to the changing signal quality between the mobile device 105 and the base station 110 is reduced by adapting the data rate for transmission to the changes in signal quality.

The mobile device 105 checks for changes in available bandwidth (step 260). Factors like distance between the base station 110 and the mobile device 105, radio frequency interference, and physical obstacles that affect the connection quality can change rapidly. Network traffic conditions can also change rapidly in mobile networks. Due to the rapidly changing signal quality, the optimal bandwidth for transmission of content can change rapidly as well. To account for this, the mobile device 105 continuously or regularly monitors the available bandwidth it has for communication with the base station 110 (step 260). The mobile device 105 can check for changes in available bandwidth by monitoring changes in CQI and DTX/DRX values. The application, or, in some implementations, a component of the mobile device's transport layer, can retrieve the channel characteristics from the radio layer at specific intervals or upon certain conditions, for example, a change in the rate of packets received, or reception of packets out of sequence. When changes in signal quality, in the form of CQI, DTX/

DRX fraction, other indicators of channel quality, or any combination thereof are detected, there is a change in available bandwidth.

If the mobile device 105 detects a change in available bandwidth for the transmission of content from the server (decision box 270), the mobile device 105 determines a new data rate (returning to step 220). In some implementations, the mobile device may continuously, or regularly, transmit a newly calculated bandwidth to the server. The new data rate is transmitted to the server and the server then transmits content at the new data rate. For example, in some implementations, a data rate can be embedded in every acknowledgement packet sent to the server 120 by the mobile device 105. Because the transmission of the determined bandwidth can be accomplished without significantly taxing the network resources, the server can change to the new data rate for transmission of content rapidly.

Figure 3A:
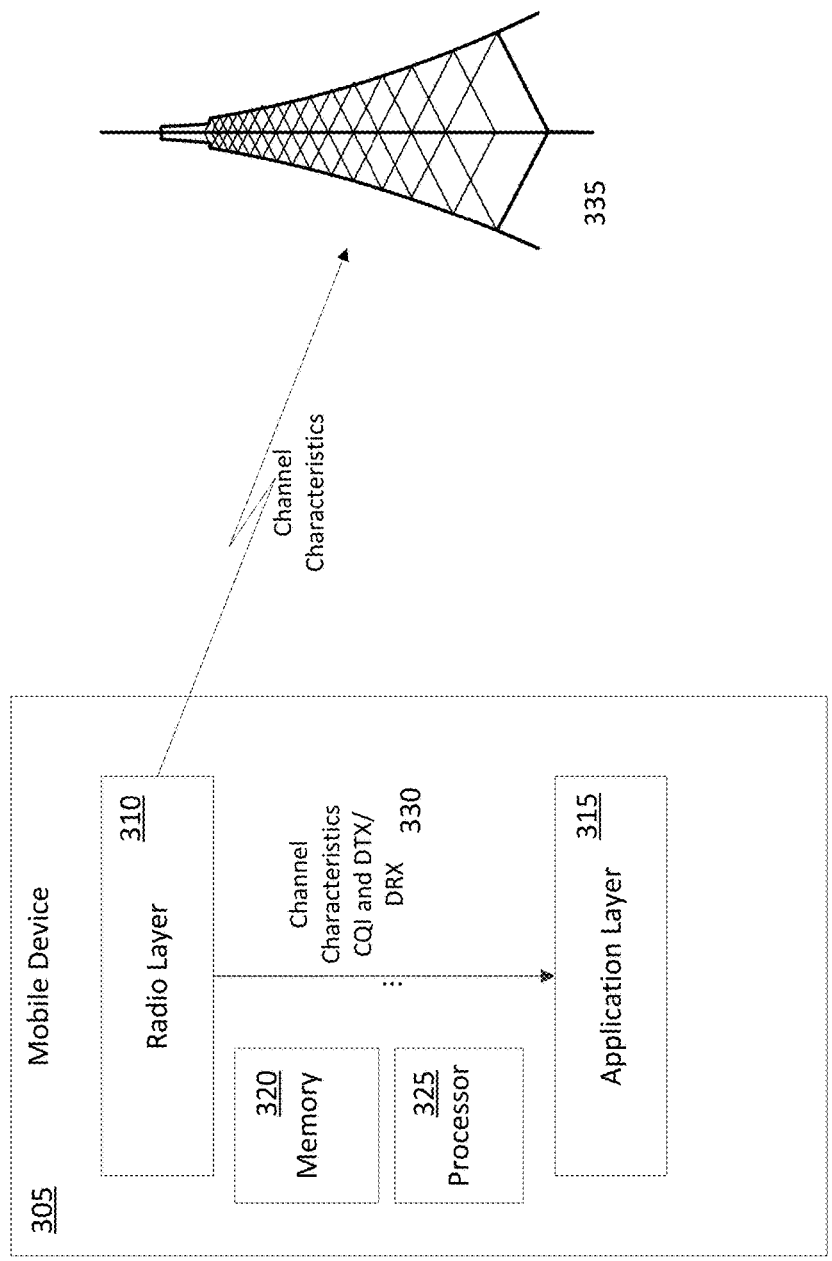
FIG. 3A is a block diagram of a mobile device in radio communication with a base station.

FIG. 3A is a block diagram depicting a mobile device 305 in communication with a base station 335. The mobile device 305 includes one or more processors 325, a memory 320, a radio layer 310 an application layer 315. To create a channel of communication between the base station 335 and the mobile device 305, the radio layer 310 of the mobile device 305 and the base station 335 exchange information, including channel characteristics 330. These channel characteristics 330 include a CQI value. The CQI value is used by the base station 335 to allocate a channel to the mobile device 305 and to determine appropriate modulation and coding schemes. Depending on the model used to describe the architecture of the mobile device 305, other abstraction layers, besides the radio layer 310 and the application layer 315 can be included. Some models, such as the OSI model include seven abstraction layers, while other models, such as the TCP/IP model include four layers. For purposes of illustration, only the application layer 315 and the radio layer 310 are shown. In some implementations, functions of the application layer 315 described herein can be implemented at other abstraction layers of the mobile device. Examples of other abstraction layers that, in some implementations, can perform the functions described in reference to the application layer 315 related to bandwidth and server data rate determination include the transport layer or the network layer.

As described above, channel characteristics 330, including CQI and DTX/DRX values, are generated by the radio layer 310 of the mobile device 305 based on communication with the base station 335. The channel characteristics 330, including a CQI value and a DTX/DRX fraction, are retrieved from the radio layer 310 by the application layer 315, or, in some implementations, the transport layer. The application layer 315 includes an application that presents content received from a server to the user. The application layer 315 determines a data rate for transmission of content by the server based on the retrieved CQI and DTX/DRX values. The determination of a data rate by the mobile device 305 is discussed further below in reference to FIG. 3B.

The transmission control protocol (TCP) is commonly used to transmit content from a server 120 to a mobile device 105. When using TCP to transfer content or data from a server 120 to a mobile device 105, the server 120 transmits data packets to the mobile device 105 and receives acknowledgment of receipt of the data packets from the mobile device 105. Based on the received acknowledgements, the server 120 calculates a congestion window that correlates to a data transmission rate. TCP assumes that packet loss is due to overload. The congestion window increases until packet loss is detected. When packet loss is detected, the congestion window is reduced, for example, by one half. The congestion window is again increased until packet loss is again detected and overload is assumed. TCP is vulnerable to rapid changes in available bandwidth as the process of data rate modulation and adjustment of the congestion window to achieve an optimal data rate takes a significant amount of time. An optimal bandwidth is not calculated prior to transmission but is determined by the sender based on packet acknowledgement. This can be inefficient because bottlenecks in data transmission rate can often lie between the base station 110 and the mobile device 105 which are not directly visible to the sender. This is due to frequently changing factors that affect the connection between the mobile device 105 and the base station 110. Because the data rate is indirectly determined at the server end based on the packet acknowledgements, the data rate does not change quickly enough to adapt to the rapidly changing connection between the base station 110 and the mobile device 105. Packet loss can also be due to other factors besides overload. For example, packet loss can occur due to a mobile device 105 moving from one cell to another, where the mobile device 105 changes the base station 110 it is communicating through while a packet is in transit. This can result in a false adaptation to overload when using TCP.

The presently disclosed systems and methods can modulate the server's data rate of transmission on the mobile device 105 end of the communication or by a server based on data obtained at the mobile device 105 end of the communication. The data rate can be modulated quicker and in a manner that is less prone to false overload due to packet loss. In some implementations, the systems and methods described herein can be used in combination with TCP, a modified version of TCP, or another protocol to improve the efficiency of data transmission. For example, the congestion windows of TCP may be used in combination with the presently disclosed systems and methods. In some implementations, presently disclosed systems and methods can be incorporated into a new protocol for data transfer to mobile devices 105.

Figure 3B:
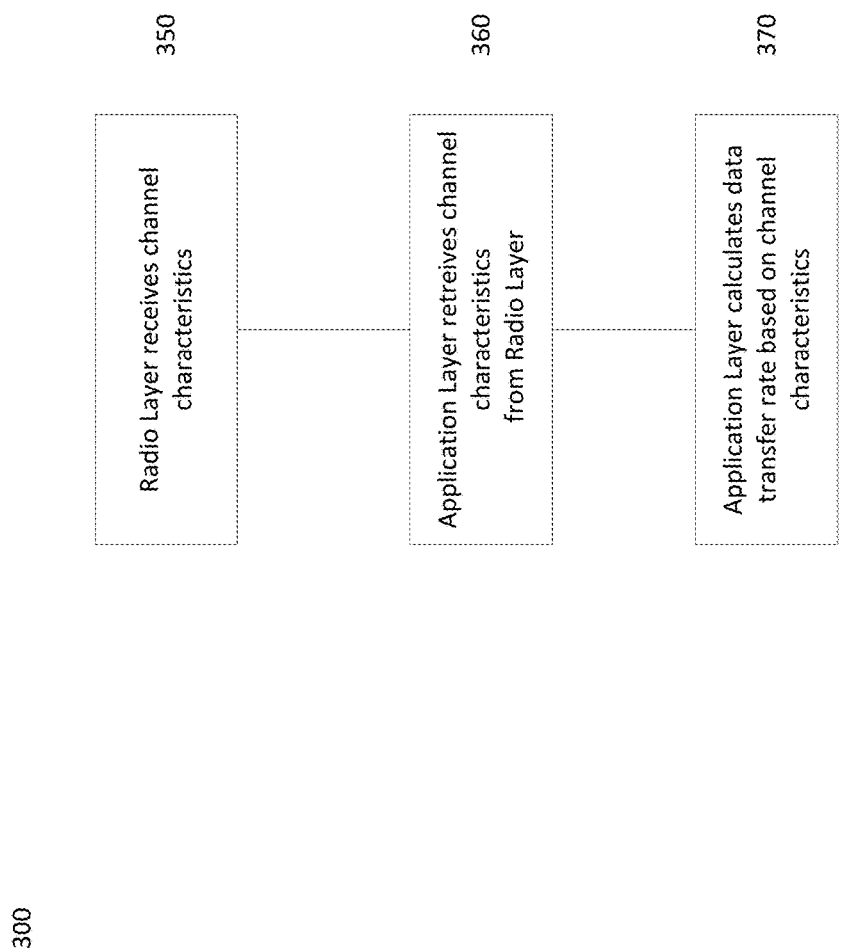
FIG. 3B is a flow diagram of an example process performed by a mobile device to determine a data rate for transmission of content from a server to the mobile device.

FIG. 3B is a flow diagram depicting a process by which a data rate is determined by the application layer 315 of a mobile device 305 (step 220). The radio layer 310 generates channel characteristics 330 (step 350). The application layer 315 retrieves channel characteristics 330 from the radio layer 310 (step 360) and the application uses the channel characteristics 330 to calculate a data rate (step 370).

The radio layer 310 generates channel characteristics 330 (step 350), including a CQI value and a DTX/DRX fraction. As discussed above, the channel characteristics 330 are metrics of the quality of the connection between the mobile device 305 and the base station 335 and other factors that can affect the channel between the base station 335 and the mobile device 305. A CQI value may be generated by the radio layer 310 at the time of establishing the connection with the base station 335. A DTX/DRX fraction can be generated by the radio layer 310 depending on a discontinuous transmission/reception cycle set by the mobile device 305, the base station 335, or a combination thereof. The mobile device 305 or the base station 335 can employ discontinuous transmission/reception cycle to affect battery life of the device. based on the quality of the connection between the base station 335 and the mobile device 305, or based on the level of concurrent communication activity of the base station 335 with other mobile devices in the cell, which may result in cellular channel congestion.

The application layer 315 of the mobile device 305 retrieves channel characteristics 330 from the radio layer 310 (step 360) and uses the channel characteristics 330 to calculate a data rate (step 370). To calculate the data rate, the application layer 315 uses a function that relates the desired data rate to be proportional to CQI and inversely proportional to DTX/DRX. Greater values for the CQI and lower values for the DTX/DRX fraction result in greater calculated data rates. As indicated above, several mobile communication standards directly correlate CQI values to modulation and coding rates, which in turn directly correlate to channel bandwidth. DTX/DRX values are indicative of the percentage of time a mobile device has access to that bandwidth. As such, in some implementations, the application layer sets the data rate to be proportional to the product of the bandwidth correlated to the CQI value and the DTX/DRX fraction. The data rate for transmission of data by the server 120 to the mobile device 105, in some implementations, is a function of the bandwidth calculated by the 3GPP standard using a CQI value, and the DTX/DRX fraction.

The determined data rate is transmitted to the server 120 by the mobile device 305 (step 230) and the server 120 transmits the content to the mobile device 305 at the determined data rate (240). In some implementations, the data rate transmitted to the server 120 can be used as a maximum data rate by the server 120. In such implementations, the server 120 can transmit data to the mobile device 305 at a data rate less than the maximum data rate, for example in response to detecting congestion in the network between the server 120 and the base station 335. As indicated above, the server 120 can implement a congestion control system to transmit the content at the determined data rate.

Figure 4:
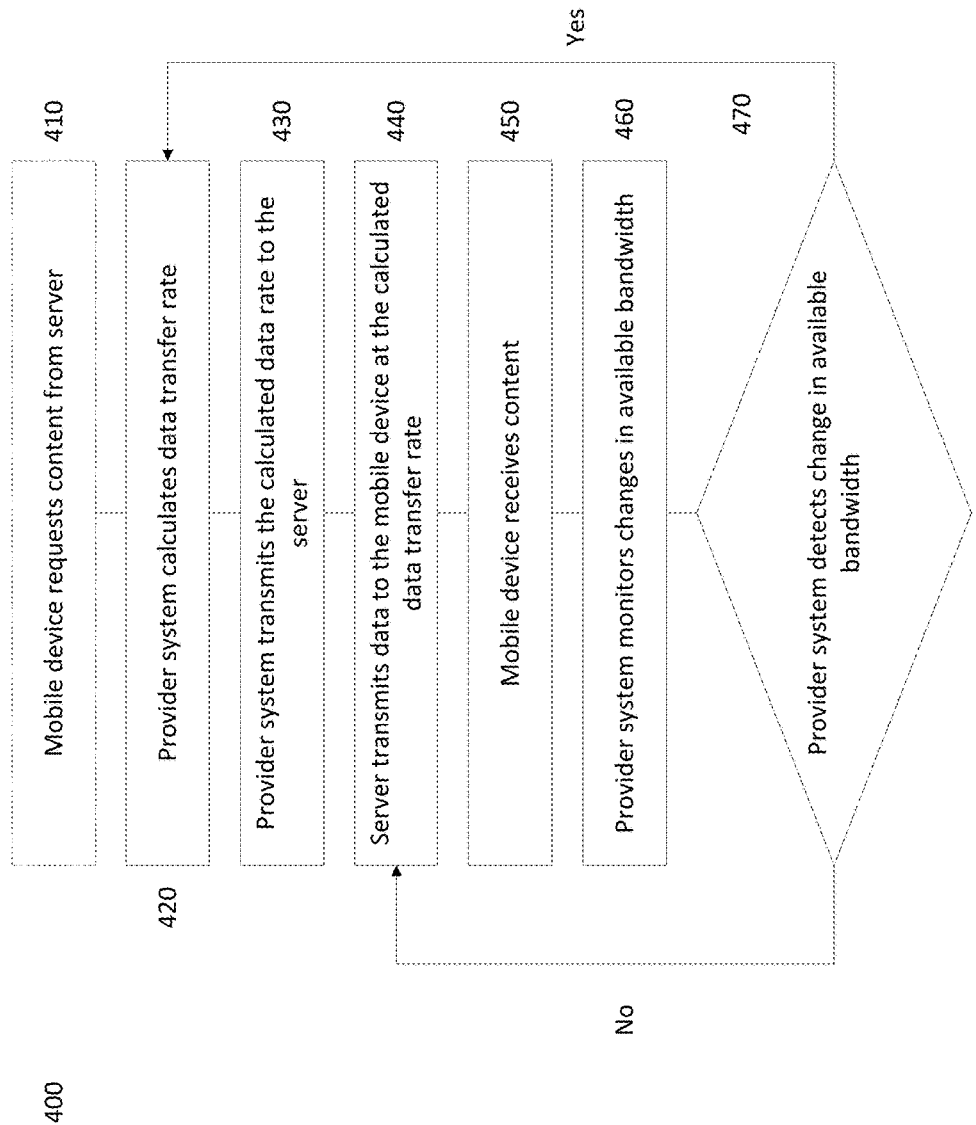
FIG. 4 is a flow diagram of a second example process of using radio layer information to improve content delivery from a server to a mobile device over a network.

FIG. 4 is a flow diagram depicting a process 400 used by a mobile device 105 to receive content from a server 120 over a network 115 via the wireless connection between the base station 110 and the mobile device 105. As used herein, a provider system refers to a base station 110, a mobile switching center 125, any other components or devices connected to the provider network, or any combination thereof. Referring to FIGS. 1 and 4, the provider system determines a data rate for the content to be transmitted by the server 120 (step 420). The provider system transmits the determined data rate to the server 120 (step 430). The server 120 transmits the content to the mobile device 105 at the determined data rate (step 440). The mobile device 105 receives the content (step 450). The provider system detects changes in the available bandwidth (step 460). If the provider system detects a change in available bandwidth (decision box 470), the provider system determines a new data rate for the transmission of the content by the server 120 to the mobile device 105 (returning to step 420). The steps depicted in FIG. 4 indicate an example of the order that the steps may be carried out in. In some implementations, the provider system can calculate the data rate (step 420) and transmit the data rate to the server 120 (step 430) after the mobile device 105 requests content from the server 120 (step 410). FIG. 4 can be understood to represent two related processes. In a first process, data rates are determined on a per cell/base station 110 basis. That is, data rates can be determined for multiple or all connections in a given cell or for connections with a specific base station 110. In a second process, data rates are determined on a per mobile device 105 or per content request basis. That is, data rates can be determined specifically for each mobile device 105 connected to a base station 110 or for each content request transmitted by a mobile device 105 to the server 120. The former process can occur without a mobile device 105 requesting content from the server 120. The latter typically involves the server 120 first receiving a content request from a mobile device 105.

The process 400 includes the provider system determining a data rate for the transmission of the content by the server 120 to the mobile device 105 (step 420) by using channel characteristics or other congestion metrics. The provider system can calculate a data rate for transmission based on channel characteristics such as CQI, DTX/DRX, PMI, RI or other characteristics, as described above in reference to FIG. 2. The provider system can also use other congestion metrics to calculate a data rate (step 420). Other congestion metrics include, but are not limited to, the total bandwidth utilized by the connections between the base station 110 and mobile devices connected to the base station or total number of connections between the base station 110 and mobile devices 105 in the cell. For example, the provider system can use the number of active connections between the base station 110 and mobile devices 105 as a congestion metric for the calculation of a data rate. In some implementations, such channel characteristics and other congestion metrics can be received by the provider system from the mobile device 105 or from the base station 110. In other implementations, the provider system generates channel characteristics used by the provider system to calculate the data rate.

In some implementations, the data rate for transmission of content from the server 120 to the mobile device 105 is calculated by the provider system continually or periodically. For example, the provider system can calculate a data rate for transmission every minute, every five minutes, every ten minutes, or more or less frequently. It can also calculate a data rate based on a trigger event, for example, one or more devices entering or leaving a cell. In other implementations, the provider system calculates a data rate for transmission (step 420) only after the mobile device 105 has requested content from the server (step 410).

The data rate for transmission of content from the server 120 to the mobile device 105 can be calculated by the mobile switching center 125 or other hardware in the provider system. In some implementations, the hardware in the provider system is configured to obtain channel characteristics or other congestion metrics by default. In some such implementations, the hardware in the provider system also calculates the data rate. In other implementations, other devices connected to the mobile switch center 125 via the provider network included in the network 115 calculate the data rate for transmission of content from the server 120 to the mobile device 105. For example, the data rate for transmission of content from the server 120 to the mobile device 105 can be calculated by a dedicated server in communication with the provider system via a provider network.

The provider system transmits the determined data rate to the server 120 (step 430). The provider system can transmit the determined data rate by any of numerous processes, for example, the provider system can send a data packet indicating the determined data rate, a remote procedure call (RPC), a TCP header, or another suitable message to the server 120 that specifies the data rate. In some implementations, the provider system transmits a calculated data rate periodically. For example, the provider system can transmit a calculated data rate to the server 120 every minute, five minutes, ten minutes, thirty minutes, or other period, even when no mobile devices have requested content from the server 120. The data rate can also be sent in response to a trigger event such as the detection of one or more devices entering or leaving a cell. In such implementations, the server stores the data rate for use in responding to subsequently received content requests to be delivered through a base station 110. In some such implementations the provider system can send a message including data rates for multiple cells or for multiple connection types (for example, 3G, 4G, LTE, or other mobile connection types) for one or more cells. The transmission including the data rate indication can include a data field indicating which content requests a given data rate indication should be applied to. For example, the transmission may identify a specific mobile device identifier, range of destination IP addresses (e.g., corresponding to a given base station), connection types, etc. In other implementations, the provider system transmits a calculated data rate only after the mobile device 105 requests content from the server (step 410). In some implementations, the server 120 is a front end server or administrative server for an application service which can then disseminate the data rate information to individual or groups of application servers fulfilling the corresponding services. In some other implementations, the server 120 is an administrative server for an application service provider that provides multiple application services. Such a server can forward the data rate information to front end and/or backend servers of one or more of the application services it provides.

The server 120 receives the transmitted data rate from the provider system and transmits the content to the mobile device 105 at the received data rate (step 440). As indicated above, in some implementations, a front end server or an administrative server for a service receives the data rate and forwards it to one or more back end application servers. In such implementations, the application server responds to the content request and transmits the content based on the indicated data rate. In some implementations, the server 120 transmits the content to the mobile device 105 based on the received data rate. For example, where the content is a video, the server 120 can transmit the video at a lower resolution based on the received data rate. As another example, the server can aggregate messages sent to the mobile device 105 based on the data rate received by the server 120. As indicated above, the server 120 can implement a congestion control system to transmit the content to the mobile device 105. An example of a congestion control system is discussed further below and in reference to FIG. 6. As described in reference to FIG. 2, the mobile device 105 receives the content from the server 120 over the network 115 and the wireless connection between the base station 110 and the mobile device 105 at the determined data rate (step 450).

The provider system checks for changes in available bandwidth (step 460). As discussed above, network traffic conditions can change rapidly in mobile networks. Due to the rapidly changing signal quality, the optimal bandwidth for transmission of content can change rapidly as well. The number of devices coupled to a base station can also change rapidly. To account for this, the provider system can continuously or regularly monitor the available bandwidth for communication between the base station 110 and the mobile device (step 460). If the provider system detects a change in available bandwidth for the transmission of content from the server (decision box 470), the provider system determines a new data rate (returning to step 420). In some implementations, the provider system may continuously, or regularly, transmit a newly calculated bandwidth to the server. The new data rate is transmitted to the server 120 and the server 120 then transmits content at the new data rate.

Figure 5:
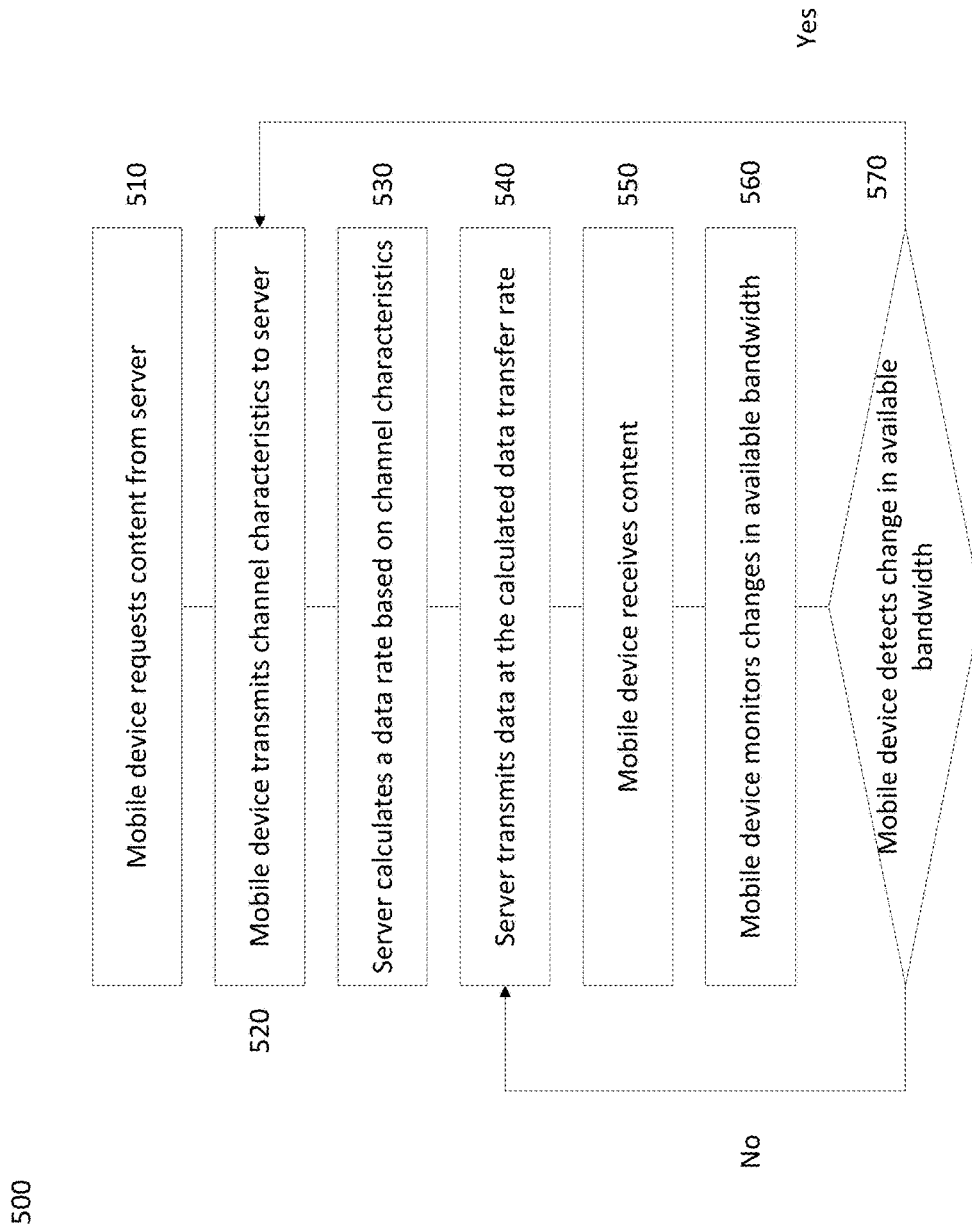
FIG. 5 is a flow diagram of an example process performed by a mobile device to determine a data rate for transmission of content from a server to the mobile device.

FIG. 5 is a flow diagram depicting a process 500 that can be used by a mobile device 105 to receive content from a server 120. The process begins with the mobile device 105 requesting content from a server 120 in the network 115 (step 510). The mobile device 105 transmits channel characteristics to the server 120 (step 520). Based on the transmitted channel characteristics, the server calculates a data rate for the content to be transmitted by the server 120 to the mobile device 105 (step 530). The server 120 transmits the content at the calculated data rate (step 540). The mobile device 105 receives the content (step 550). The mobile device 105 detects changes in the available bandwidth (step 560). If the mobile device 105 detects a change in available bandwidth (decision box 570), the mobile device 105 transmits new channel characteristics to the server 120 (returning to step 520) and the server calculates a new data rate based on the new channel characteristics (step 530).

The mobile device requests content from the server as described above, in reference FIG. 2 (step 510). As discussed, the content can be any form of discrete file or steamed media. The mobile device 105 transmits channel characteristics to the server 120 (step 520). The channel characteristics are retrieved from the radio layer, by an application, or a component of the transport layer, on the mobile device 105. Channel characteristics are described above in greater detail, in reference to FIG. 3B. The mobile device 105 can transmit the channel characteristics by any of numerous methods, for example, the mobile device 105 can send a data packet indicating the channel characteristics, a remote procedure call (RPC), or another suitable message to the server 120 that indicates the channel characteristics. In some implementations, the mobile device may embed the channel characteristics in one or more acknowledgement packets sent to the server.

The calculation of a data rate can be carried out by the server (step 530) in the same manner as the calculation of data rate by the mobile device 105 discussed above, in reference to FIG. 3B. In some implementations, the server may also use additional networking metrics observed by the server to calculate the data rate. Examples of such additional networking metrics includes packet loss-rate and round trip time (RTT). The server transmits the data to the mobile device 105 at the calculated data rate (step 540).

As discussed above, in reference to FIG. 3B, the mobile device 105 can monitor changes in available bandwidth for communication with the base station 110 continuously or regularly (step 560). For example, the mobile device 105 can check for changes in available bandwidth by monitoring changes in CQI and DTX/DRX values once every second.

If the mobile device 105 detects a change in available bandwidth for the transmission of content from the server 120 to the mobile device 105 (decision box 570), the mobile device 105 transmits new channel characteristics to the server (returning to step 520). In some implementations, the mobile device may continuously, or regularly, send channel conditions to the server. The server calculates a new data rate and transmits the data to the mobile device 105 at the new data rate. Because the transmission of the channel characteristics can be accomplished without significantly taxing the network resources, the server can change to the new data rate for transmission of content rapidly.

Figure 6:
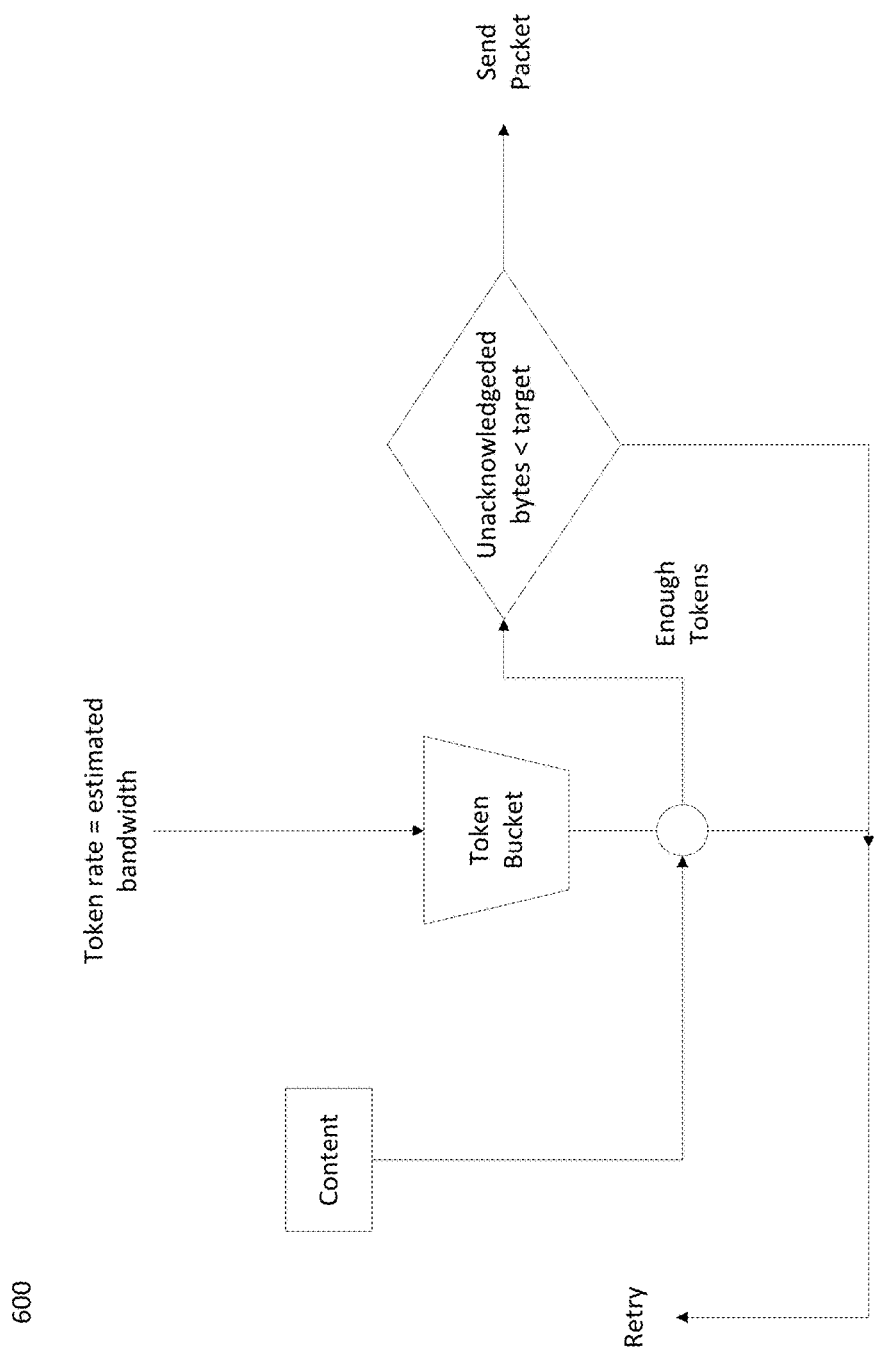
FIG. 6 is a schematic diagram of a process employed by a server to enforce a data rate provided by a mobile device.

FIG. 6 depicts an example of a congestion control system used by the server 120 to transmit content to the mobile device 105 at the data rate indicated by the mobile device 105. The congestion control system 600 includes a token bucket. The token bucket is a virtual reservoir for tokens that act as credits for sending packets from the server 120. The token bucket has a maximum capacity of tokens that can be defined (also referred to as "token bucket depth"). Tokens are added to the token bucket at the token rate. The token rate can be the data rate determined by the mobile device 105 or it can be proportional to the data rate determined by the mobile device 105. The content is transmitted in the form of data packets. The number of tokens in the token bucket is reduced for each packet sent. For example, the number of tokens in the token bucket can be reduced by one token for each packet, one token for each byte of data transmitted or by some other amount proportional to the amount of data transmitted by the server 120. If there are not enough tokens in the token buckets to send a data packet, the data packet is not sent and the server 120 retries the transmission until enough tokens have accumulated in the token bucket to transmit the packet. If there are enough tokens in the token bucket to send a data packet, the server 120 checks to make sure that the number of bytes of data that have not been acknowledged by the mobile device 105 (also referred to as "unacknowledged bytes") is below a threshold amount. If the number of unacknowledged bytes is equal to or greater than a threshold amount of unacknowledged bytes, the server 120 does not send the packet and retries until the amount of unacknowledged bytes is less than the threshold amount of unacknowledged bytes. If the amount of unacknowledged bytes is less than a threshold amount of unacknowledged bytes, the server 120 sends the packet to the mobile device 105. In some implementations, the above described congestion control system can be implemented as computer executable instructions executing on a processor at the server. The computer executable instructions can be included in the operating system on the server, a virtual machine operating system, a hypervisor on the server, or in a network interface controller at the server.

In a typical mobile network, before a mobile device can receive or transmit data, the mobile device needs to request the use of a data channel. To conserve resources, mobile operators reclaim data channels allocated to connections that stay idle for a configurable amount of time. Application servers deliver large data files (e.g., video) to mobile devices in one or more data chunks whereby the whole data files is divided into smaller chunks and the server transmits each of the chunks independently. After delivering one data chunk, the connection becomes idle and gets reclaimed by the cellular network. The mobile device needs to re-establish the data channel before it can receive the next chunk.

By adjusting the chunk size, application servers can reduce the overhead of channel establishment and timeout. Doing so, reserves network resources and power consumption on the mobile device.

Figure 7:
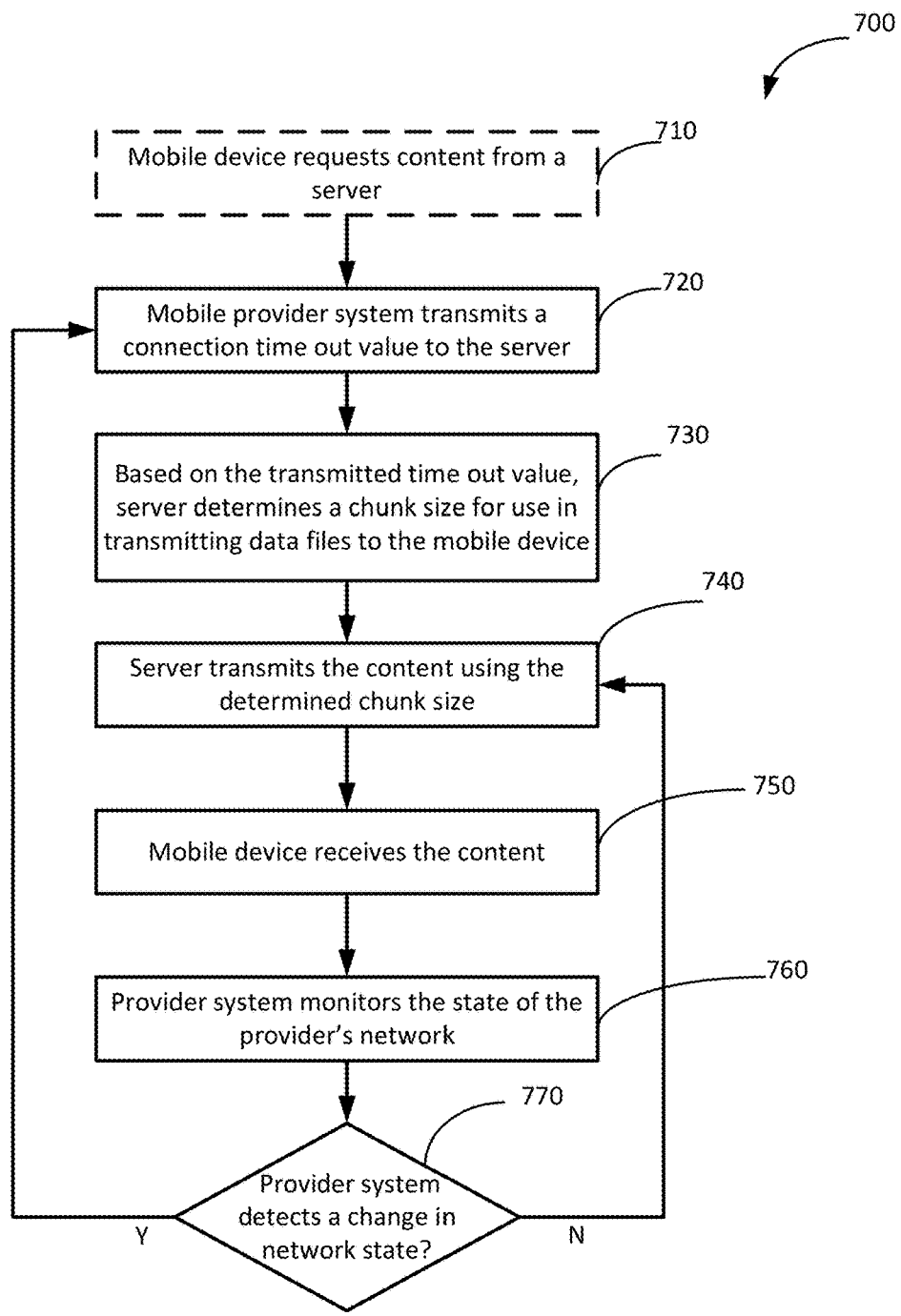
FIG. 7 is a flow diagram of an example process of determining data chunk size for use in transmitting data to a mobile device over a mobile provider system.

FIG. 7 is a flow diagram of an example process 700 of determining data chunk size for use in transmitting data to a mobile device over a mobile provider system. The process optionally begins with the mobile device 105 requesting content from a server 120 in coupled to the network 115 (step 710). The mobile provider system transmits a connection time out value to the server 120 (step 720). Based on the transmitted time out value, the server determines a chunk size for use in transmitting data files to the mobile device (step 730). The server 120 transmits the content using the determined chunk size (step 740). The mobile device 105 receives the content (step 750). The provider system monitors the state of the provider's network (step 760). If the provider system detects a change in network state (decision box 770), the provider system transmits new time out values to the server 120 (returning to step 720) and the server calculates a new chunk size based on the new time out value (step 730).

As with the flow diagram shown in FIG. 4, the flow diagram shown in FIG. 7 can represent two different, but related processes. That is, the process can begin with as server 120 receiving a request for content form a mobile device (step 710), in which case, the process can be applied on a device-by-device or request-by-request basis, or, the process can begin with the provider system transmitting timeout values to the server 120 without a mobile device necessarily having requested content. In this latter process, the time out values can be associated with one or more provider system cells or base stations and are used for some or all future requests for content originating from that cell or base station (until a new time out value is transmitted). The provider system may also send different time out values for different connection types (e.g., 3G, 4G, LTE, etc.)

As indicated above, the process 700 may optionally begin with a server receiving a request for content form a mobile device (step 710). The request can come in the form, for example, a request for a specific item of content, such as an HTTP request identifying the URL of an item of multimedia content. Alternatively, the request can include a user of the mobile device logging into a service provided by the server that intermittently pushes data content to the mobile device. For example, the service can be a messaging application, such as an instant messaging application, an e-mail service, a social media application, or any service configured to spontaneously push content to the mobile device.

The process also includes the provider system transmitting a connection time out value to the server 120 (step 720). The provider system, for example, via devices located at a mobile switching center 125, can forward the timeout value directly to a back end server fulfilling a content request. Alternatively, the mobile provider can forward the timeout value to a front end server or administrative server associated with the application service, which can then disseminate the timeout value to associated back end servers. In some implementations, the mobile provider can provide the time out value to an administrative server provider operated by a service provider that is associated with a group of application services. The administrative server can then disseminate the timeout value to front end and/or back end servers associated with multiple application services provided by the service provider. The transmission of the timeout value may indicate to which content requests the recipient should apply the timeout value by indicating a specific mobile device, data flow, connection type, destination identifier (e.g., a range of destination IP addresses), application type, or other identifier.

The server 120 then determines a chunk size for use in transmitting data files to the mobile device based on the time out value (step 730). In some implementations, if the time out value is transmitted to a front end or administrative server, the front end or administrative server calculates the chunk size and forwards the chunk size to its associated back end servers. In other implementations, the back end servers calculate the chunk size directly based on the timeout values. In some implementations, the server (administrative, front end, or back end) calculates the chunk size based on a maximum desired idle time for the radio of the mobile device. For example, the chunk size can be determined according to the following equation:

$$ChunkSize = FileSize \times TimeOut / MaxIdle$$

For example, assume a mobile device 105 requests a 1.0 MB file, the mobile provider indicates a timeout value of 2.0 seconds and the maximum desired idle time is 20 seconds. As the mobile provider will institute a 2.0 second timeout after each chunk, a file can be broken up into 10 chunks without exceeding the 20 second max idle time. The file size, in this example 1.0 MB, would then be divided by the number of chunks, i.e., 10, to result in a chuck size of 100 KB.

The application service, via a server, transmits the requested content to the mobile device 105 (step 740) and mobile device 105 receives the content (step 750), combining the chunks back into the originally requested file. As indicated above, the mobile provider can monitor the state of the network (step 760) and, if it detects a change (at decision box 770), it can transmit a new timeout value (returning to step 720).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The terms "computer," "computing device" or "processor" include all kinds of apparatus, devices, and machines for processing data, including by way of example a programmable processor, a computer, a mobile device 105, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The invention claimed is:

1. A system, comprising:
one or more server devices associated with an application service provider, configured to:
receive, from a mobile service provider, a first inter-chunk timeout value message including a first inter-chunk timeout value and information identifying a set of communications for which the first inter-chunk time out value is to be applied, wherein the first inter-chunk timeout value is associated with allocation of data channels to one or more mobile devices, the first inter-chunk timeout value represents an amount of idle time enforced by the mobile service provider between data chunk transmissions from the mobile service provider to a given mobile device, and the information identifying the set of communications indicates at least one of identifiers of specific mobile devices to which the first inter-chunk timeout value applies, a data flow to which the first inter-chunk timeout value applies, a connection type to which the first inter-chunk timeout value applies, a destination address to which the first inter-chunk timeout value applies, or an application type to which the first inter-chunk timeout value applies;
determine a first data chunk size for use in transmitting data from the one or more server devices via the mobile service providers for the set of communications identified in the first inter-chunk timeout value message wherein the first data chunk size is determined as a function of a value of the received first inter-chunk timeout value;
transmit data to one or more mobile devices associated with the first set of communications based on the at least one indication included in the information included in the first inter-chunk timeout value message using data chunks at the determined first data chunk size;
receive, from the mobile service provider, a second inter-chunk timeout value different from the first inter-chunk timeout value;
determine a second data chunk size different from the first data chunk size; and
transmit data to the one or more mobile devices using data chunks at the determined second data chunk size.

2. The system of claim 1, wherein the one or more server devices are configured to determine the first data chunk size such that the first data chunk size is proportional to the first inter-chunk timeout value.

3. The system of claim 1, wherein:
the one or more server devices are configured to determine the first data chunk size such that the first data chunk size is inversely proportional to a maximum aggregate idle time, set by the mobile service provider, of a radio of the one or more mobile devices incurred in the transmission of a given file.

4. The system of claim 3, wherein the one or more server devices receive a value of the maximum aggregate idle time concurrently with a content request from the one or more mobile devices.

5. The system of claim 1, wherein determining the first data chunk size comprises, for a file to be transmitted to the one or more mobile devices, multiplying a size of the file by a ratio of the first inter-chunk timeout value and a maximum aggregate idle time of a radio of the one or more mobile devices set by the mobile service provider.

6. The system of claim 1, wherein the first inter-chunk timeout value corresponds to the one or more mobile devices, and the one or more server devices receive the first inter-chunk timeout value concurrently with a content request from one of the one or more mobile devices.

7. The system of claim 1, wherein the information identifying the set of communications indicates identifiers of specific mobile devices to which the first inter-chunk timeout value applies.

8. The system of claim 1, wherein the information identifying the set of communications indicates one or more data flows to which the first inter-chunk timeout value applies.

9. The system of claim 1, wherein the information identifying the set of communications indicates a connection type to which the first inter-chunk timeout value applies.

10. The system of claim 1, wherein the information identifying the set of communications indicates a destination address to which the first inter-chunk timeout value applies.

11. The system of claim 1, wherein the information identifying the set of communications indicates an application type to which the first inter-chunk timeout value applies.

12. A method, comprising:
receiving, by one or more server devices associated with an application service provider from a mobile service provider, a first inter-chunk timeout value message including a first inter-chunk timeout value and information identifying a set of communications for which the first inter-chunk timeout value is to be applied, wherein the first inter-chunk timeout value is associated with allocation of data channels to one or more mobile devices communicating with the one or more server devices, the first inter-chunk timeout value represents an amount of idle time enforced by the mobile service provider between data chunk transmissions from the mobile service provider to a given mobile device, and the information identifying the set of communications indicates at least one of identifiers of specific mobile devices to which the first inter-chunk timeout value applies, a data flow to which the first inter-chunk timeout value applies, a connection type to which the first inter-chunk timeout value applies, a destination address to which the first inter-chunk timeout value applies, or an application type to which the first inter-chunk timeout value applies;
determining, by the one or more server devices, a first data chunk size for use in transmitting data from the one or more server devices via the mobile service providers for the set of communications identified in the first inter-chunk timeout value message, wherein the first data chunk size is determined as a function of a value of the received first inter-chunk timeout value;
transmitting, by the one or more server devices, data to the one or more mobile devices associated with the first set of communications based on the at least one indication included in the information included in the first inter-chunk timeout value message using data chunks at the determined first data chunk size;
receiving, from the mobile service provider, a second inter-chunk timeout value different from the first inter-chunk timeout value;
determining a second data chunk size different from the first data chunk size; and
transmitting data to the one or more mobile devices using data chunks at the determined second data chunk size.

13. The method of claim 12, wherein the one or more server devices determine the first data chunk size such that the first data chunk size is proportional to the first inter-chunk timeout value.

14. The method of claim 12, wherein:
the one or more server devices determine the first data chunk size such that the first data chunk size is inversely proportional to a maximum aggregate idle time, set by the mobile service provider, of a radio of the one or more mobile devices incurred in the transmission of a given file.

15. The method of claim 14, comprising:
receiving, by the one or more server devices from the one or more mobile devices, a value of the maximum aggregate idle time concurrently with a content request.

16. The method of claim 12, wherein determining the first data chunk size comprises, for a file to be transmitted to the one or more mobile devices, multiplying a size of the file by a ratio of the first inter-chunk timeout value and a maximum aggregate idle time of a radio of the one or more mobile devices set by the mobile service provider.

17. The method of claim 12, comprising:
receiving, by the one or more server devices from the mobile device, a value of the first inter-chunk timeout value concurrently with a content request from the particular mobile device.

18. Non-transitory, computer readable media storing processor executable instructions, which, when carried out by one or more processors of one or more server devices associated with an application service provider, cause the processors to:
receive, at the one or more server devices from a mobile service provider, a first inter-chunk timeout value message including a first inter-chunk timeout value and information identifying a set of communications for which the first inter-chunk timeout value is to be applied, wherein the first inter-chunk timeout value is associated with allocation of data channels to one or more mobile devices, the first inter-chunk timeout value represents an amount of idle time enforced by the mobile service provider between data chunk transmissions from the mobile service provider to a given mobile device, and the information identifying the set of communications indicates at least one of identifiers of specific mobile devices to which the first inter-chunk timeout value applies, a data flow to which the first inter-chunk timeout value applies, a connection type to which the first inter-chunk timeout value applies, a destination address to which the first inter-chunk timeout value applies, or an application type to which the first inter-chunk timeout value applies;
determine, by the one or more server devices, a first data chunk size for use in transmitting data from the one or more server devices via the mobile service providers for the set of communications identified in the first inter-chunk timeout value message, wherein the first data chunk size is determined as a function of a value of the received first inter-chunk timeout value;
transmit, by the one or more server devices, data to the one or more mobile devices associated with the first set of communications based on the at least one indication included in the information included in the first inter-chunk timeout value message using data chunks at the determined first data chunk size, receive, from the mobile service provider, a second inter-chunk timeout value different from the first inter-chunk timeout value;

determine a second data chunk size different from the first data chunk size; and transmit data to the one or more mobile devices using data chunks at the determined second data chunk size.

19. The computer readable media of claim 18, wherein the instructions cause the processors to determine the first data chunk size by, for a file to be transmitted to the mobile device, multiplying a size of the file by a ratio of the first inter-chunk timeout value and a maximum aggregate idle time of a radio of the one or more mobile devices set by the mobile service provider.

\* \* \* \* \*